(12) United States Patent
Lee

(10) Patent No.: US 10,741,811 B2
(45) Date of Patent: Aug. 11, 2020

(54) PREPARATION METHOD AND PREPARATION APPARATUS OF SEPARATION MEMBRANE FOR ELECTROCHEMICAL DEVICE

(71) Applicants: LG Chem, Ltd., Seoul (KR); TORAY INDUSTRIES, INC., Tokyo (JP)

(72) Inventor: Joo-Sung Lee, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 84 days.

(21) Appl. No.: 15/554,918

(22) PCT Filed: Mar. 2, 2016

(86) PCT No.: PCT/KR2016/002083
§ 371 (c)(1),
(2) Date: Aug. 31, 2017

(87) PCT Pub. No.: WO2016/140508
PCT Pub. Date: Sep. 9, 2016

(65) Prior Publication Data
US 2018/0040865 A1    Feb. 8, 2018

(30) Foreign Application Priority Data

Mar. 2, 2015    (KR) .................. 10-2015-0028851

(51) Int. Cl.
*H01M 2/14*    (2006.01)
*H01M 10/052*    (2010.01)
(Continued)

(52) U.S. Cl.
CPC .......... *H01M 2/145* (2013.01); *H01M 2/166* (2013.01); *H01M 2/1686* (2013.01); *H01M 2/18* (2013.01); *H01M 10/052* (2013.01)

(58) Field of Classification Search
CPC .... H01M 2/145; H01M 2/166; H01M 2/1686; H01M 2/18; H01M 10/052
See application file for complete search history.

(56) References Cited

U.S. PATENT DOCUMENTS 4,592,946 A * 6/1986 Shuman ................. B41M 5/392
427/148
2010/0252426 A1 * 10/2010 Tsukuda ................... H01G 9/02
204/296
(Continued)

FOREIGN PATENT DOCUMENTS

CN    201900149 U    7/2011
CN    203470293 U    3/2014
(Continued)

OTHER PUBLICATIONS

Search report from International Application No. PCT/KR2016/002083, dated Jun. 21, 2016.
(Continued)

*Primary Examiner* — Katherine A Bareford
*Assistant Examiner* — Christina D McClure
(74) *Attorney, Agent, or Firm* — Lerner, David, Littenberg, Krumholz & Mentlik, LLP

(57) ABSTRACT

A preparation method of a separator for an electrochemical device, and a preparation apparatus therefor are provided. The preparation method includes: supplying a porous separator substrate; coating one surface of the porous separator substrate with a first coating agent and a second coating agent by means of a first coating part of a die coating method that includes a first roller; coating the other surface of the porous separator substrate with a third coating agent by means of a second coating part of a roll coating method that includes a second roller; and forming a first coating layer, a second coating layer and a third coating layer by drying the porous separator substrate coated with the first coating (Continued)

agent, the second coating agent and the third coating agent coated thereon, in which a pattern is formed on the surface of the second roller.

8 Claims, 6 Drawing Sheets

(51) Int. Cl.
*H01M 2/16* (2006.01)
*H01M 2/18* (2006.01)

(56) References Cited

U.S. PATENT DOCUMENTS

| | | | | |
|---|---|---|---|---|
| 2011/0259505 | A1* | 10/2011 | Lee | H01M 2/145 156/78 |
| 2013/0095357 | A1* | 4/2013 | Bhardwaj | H01M 10/0431 429/94 |
| 2013/0244082 | A1* | 9/2013 | Lee | H01M 2/1646 429/145 |
| 2013/0280583 | A1* | 10/2013 | Lee | H01M 2/1686 429/144 |
| 2014/0370358 | A1 | 12/2014 | Hong et al. | |
| 2015/0202647 | A1* | 7/2015 | Watanabe | B05C 1/0808 156/390 |

FOREIGN PATENT DOCUMENTS

| | | | |
|---|---|---|---|
| CN | 104275268 A | 1/2015 | |
| KR | 20100081396 A | 7/2010 | |
| KR | 20110035847 A | 4/2011 | |
| KR | 20120121152 A | 11/2012 | |
| KR | 20130011973 A | 1/2013 | |
| KR | 20130066746 A | 6/2013 | |
| KR | 20130123744 A | 11/2013 | |
| KR | 20150001963 A | 1/2015 | |
| WO | WO-2014025004 A1 * | 2/2014 | B05C 1/0808 |

OTHER PUBLICATIONS

Chinese Search Report from Application No. CN 201680013129.3, dated Sep. 24, 2019.

* cited by examiner

[Fig. 1]
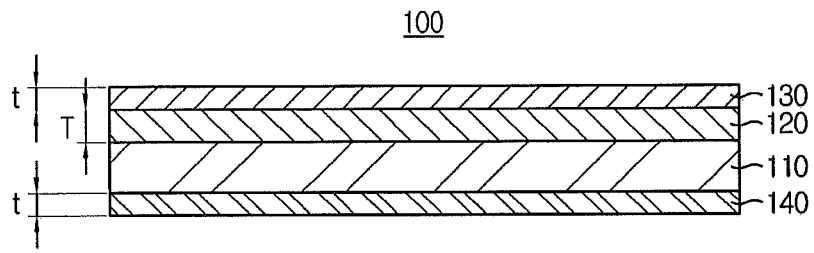
[Fig. 2]
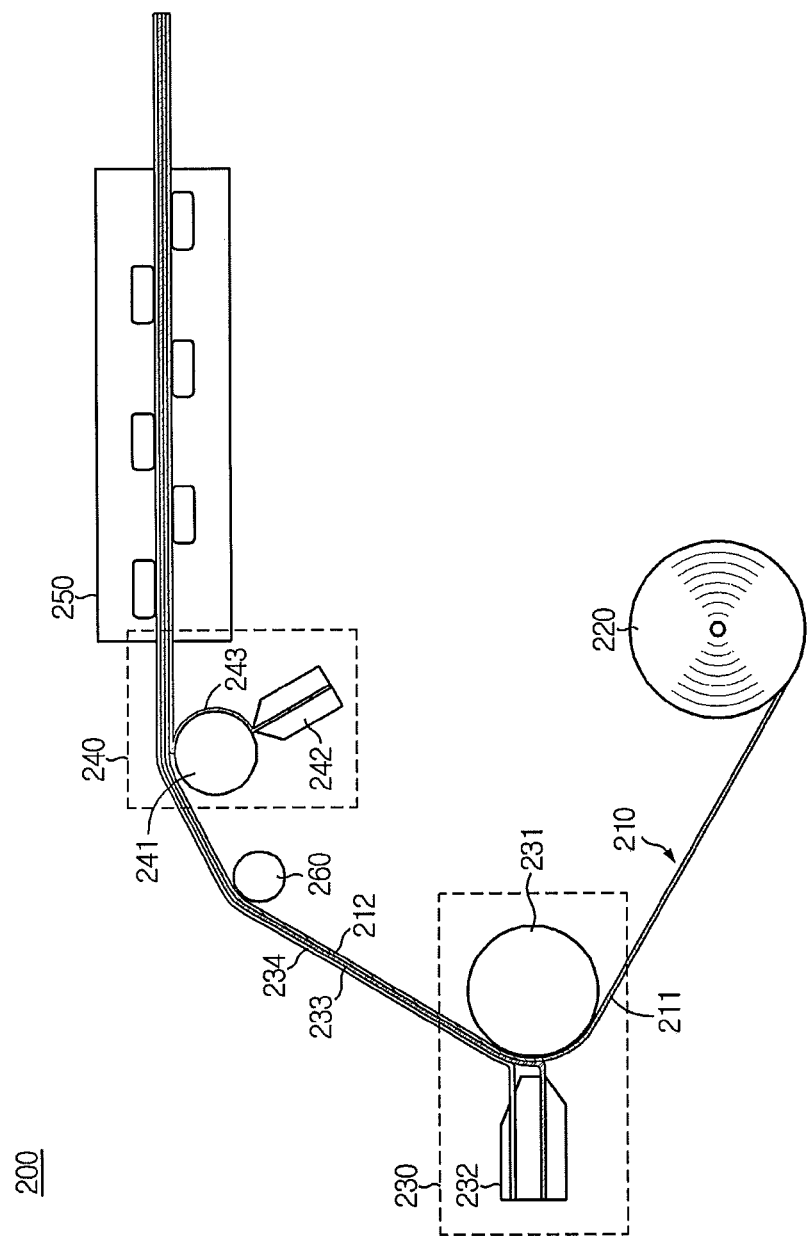

[Fig. 3]
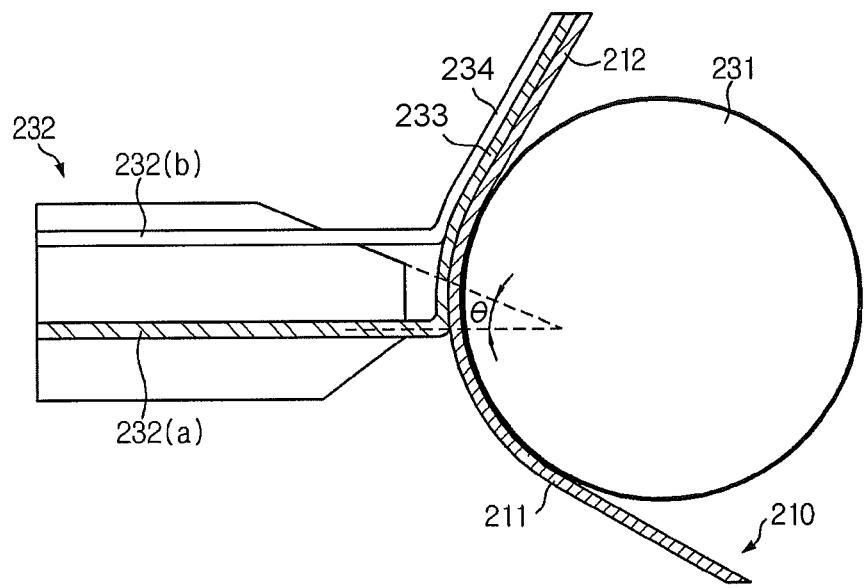
[Fig. 4]
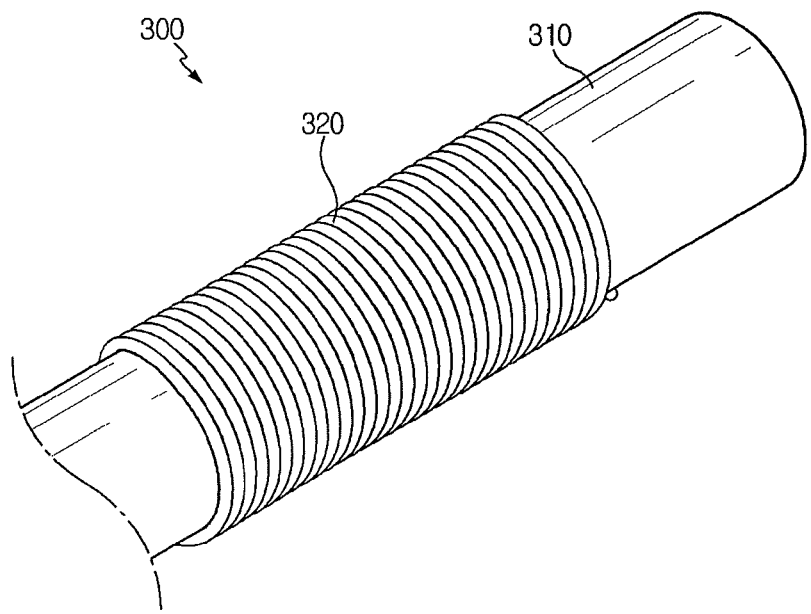

[Fig. 5]
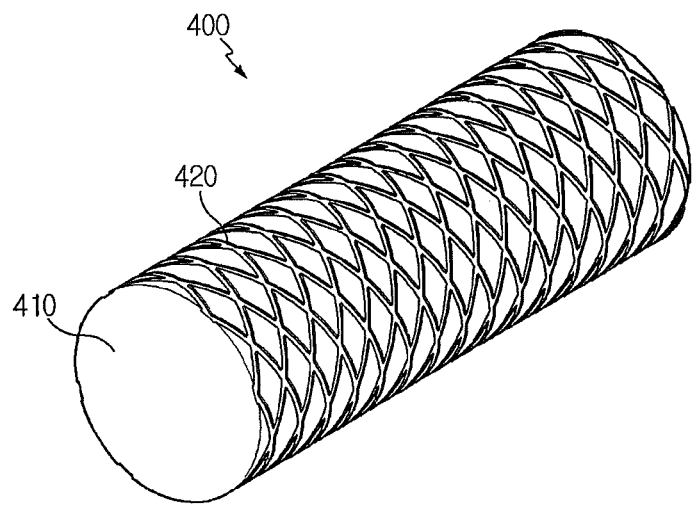
[Fig. 6]
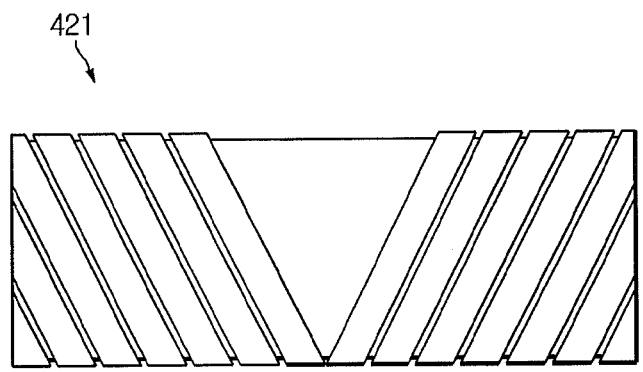
[Fig. 7]
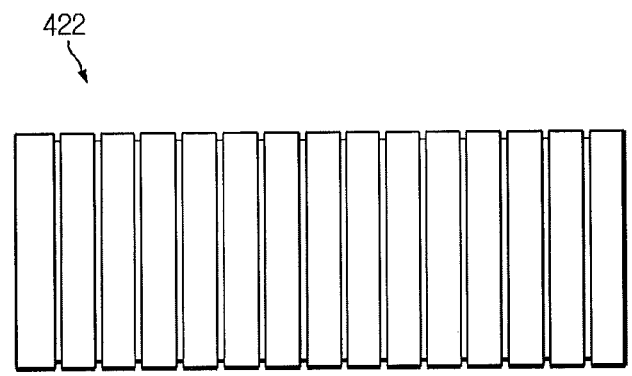

[Fig. 8]
423
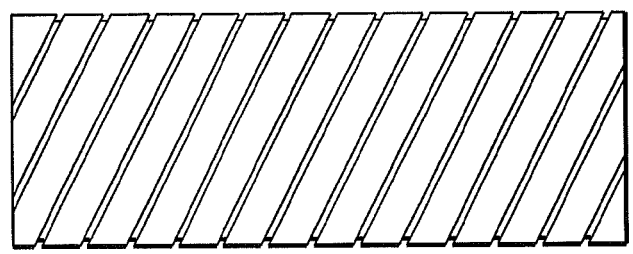
[Fig. 9]
424
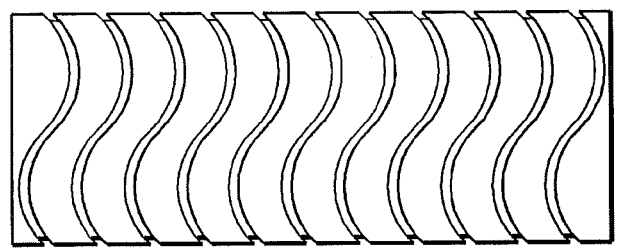
[Fig. 10]
425
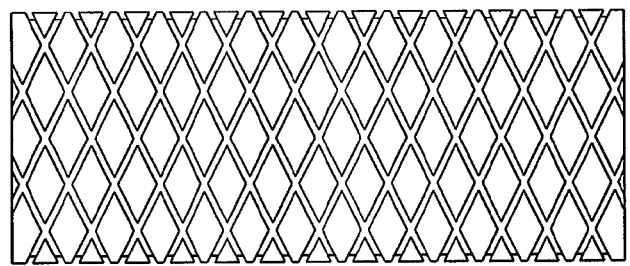

[Fig. 11]
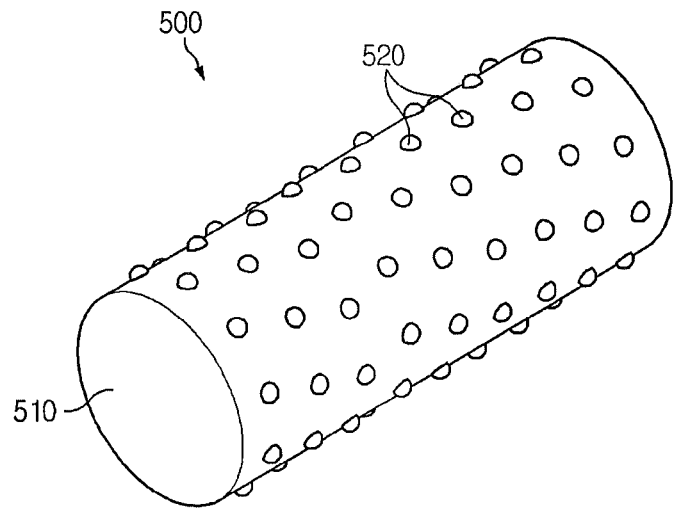
[Fig. 12]
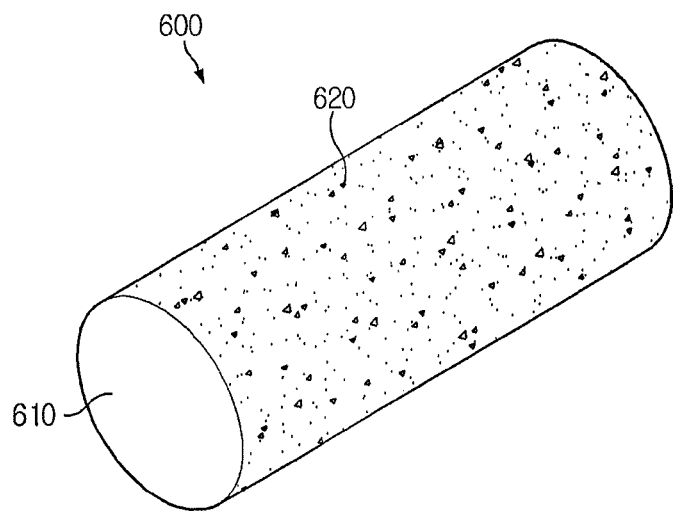
[Fig. 13a]
[Fig. 13b]
[Fig. 13c]
[Fig. 13d]

[Fig. 13e]
[Fig. 13f]
[Fig. 13g]
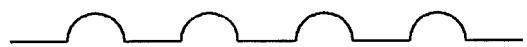

ern the negative electrode and the positive electrode are repeatedly intercalated and deintercalated to and from the negative electrode.

PREPARATION METHOD AND PREPARATION APPARATUS OF SEPARATION MEMBRANE FOR ELECTROCHEMICAL DEVICE

CROSS-REFERENCE TO RELATED APPLICATION

This application is a national phase entry under 35 U.S.C. § 371 of International Application No. PCT/KR2016/002083, filed Mar. 2, 2016, which claims priority to Korean Patent Application No. 10-2015-0028851, filed Mar. 2, 2015, the disclosures of which are incorporated herein by reference.

TECHNICAL FIELD

The present disclosure relates to a preparation method and a preparation apparatus of a separator for an electrochemical device.

BACKGROUND ART

Technological development and demand for mobile devices have increased, giving rise to exponentially increased demand for batteries as energy source. Accordingly, increased number of researches have been conducted, focusing on the batteries that can meet a variety of demands.

For example, in terms of the shape of batteries, demand is high for prismatic secondary batteries or pouch-shaped secondary batteries thin enough to be employed in products such as cellular phones. In terms of the material for batteries, on the other hand, demand is high for lithium secondary batteries, such as lithium ion batteries and lithium ion polymer batteries, which provides advantage such as high energy density, discharge voltage, output stability, and so on.

Further, the secondary battery may be classified according to positive electrode/separator/negative electrode structure of an electrode assembly. For example, the jelly-roll type electrode assembly has a structure in which long sheets of positive electrodes and negative electrodes with a separator interposed therebetween are wound together, and the stack type electrode assembly has a structure in which a plurality of positive electrodes and negative electrodes, which are cut in a certain size unit, are sequentially stacked while having the separator interposed therebetween, and the stack/folding type electrode assembly has a structure in which bi-cells or full cells having positive electrodes and negative electrodes of certain unit and intervened by separator are wound with separator sheets.

The lithium secondary battery uses metal oxide such as $LiCoO_2$ or the like as a positive electrode active material and a carbonaceous material as a negative electrode active material, and is prepared by placing a polyolefin-based porous separator between a negative electrode and a positive electrode, and providing a non-aqueous electrolyte containing lithium salt such as $LiPF_6$ or the like. During charging, lithium ions of the positive electrode active material are released and intercalated into a carbon layer of the negative electrode. Conversely, i.e., during discharge, lithium ions of the negative electrode carbon layer are released and intercalated into the positive electrode active material. At this time, the non-aqueous electrolyte serves as a medium through which the lithium ions migrate between the negative electrode and the positive electrode. Such lithium secondary battery is charged and discharged as the lithium ions of the positive electrode are repeatedly intercalated and deintercalated to and from the negative electrode.

An electrode assembly having positive electrode/separator/negative electrode may be basically formed as a simple stack structure. On the other hand, the electrode assembly may be formed as a structure in which a plurality of electrodes (positive electrodes and negative electrodes), which are intervened by the separators, are stacked and bonded together by heating/pressing. In this case, bonding of the electrodes and the separators is achieved by heating/pressing, while the adhesive layers formed on the separator and the electrodes are faced each other.

In order to enhance adhesion of the separator to the electrode and thus solve a safety problem, it has been recently suggested to use an organic/inorganic composite separator coated with a slurry containing an excess amount of inorganic particles and binder polymer on a separator substrate.

Because the coating layer of the organic/inorganic composite separator is composed of an excess amount of the inorganic particles that takes most part, it may be effective in solving a safety problem caused by nail penetration, or the like. However, due to a relatively lower content of the binder polymer, a desired adhesion to electrodes is not provided. Further, while the content of the binder polymer may be increased, it may cause a problem that the same level of safety as provided by the configuration mentioned above cannot be provided.

Meanwhile, as one of general methods for coating the coating layer on a surface of the separator, the dip coating may be performed, by impregnating the separator sheets in a mixed solution of binder and inorganic components dispersed therein to form coating layer.

However, such dip coating has limitations in view of working speed, and it is also difficult to completely isolate a dipping device from outside, allowing solvent in the dipping device to continuously evaporate during the process and thus causing changes in the solids and deteriorated uniformity of the coating layer. It is also necessary to ensure that the process is kept under the constant condition.

Accordingly, there is a pressing need for a separator that can simultaneously improve both its adhesion to electrode and safety, and a preparation method of separator that can maximize productivity and also improve uniformity of the coating layer.

DISCLOSURE

Technical Problem

The present disclosure has been made to solve the above problems and other technical problems that have yet to be resolved.

Specifically, it is an object of the present disclosure to provide a separator for an electrochemical device improved with adhesion between the separator and an electrode and safety of a battery simultaneously, by sequentially forming a coating layer containing inorganic particles and binder polymer, and a coating layer containing binder polymer on one surface of a porous separator substrate, and forming only a coating layer containing binder polymer on the other surface of the porous separator substrate.

Further, the present disclosure is directed to providing a preparation method of a separator which sequentially adopts die coating method for coating on one surface and then roll coating method for coating on the other surface, thus solving a problem of traveling characteristic occurring in a soft substrate when a coating agent is coated on the other surface and also improves productivity and uniformity of the separator, and a coating apparatus therefor.

Technical Solution

In one aspect of the present disclosure, there is provided a separator for an electrochemical device including: a porous separator substrate; a first coating layer formed on one surface of the porous separator substrate and containing an inorganic particle and a first binder polymer; a second coating layer formed on the first coating layer and containing a second binder polymer; and a third coating layer formed on the other surface of the porous separator substrate and containing a third binder polymer.

More specifically, the first coating layer may be composed of the inorganic particle and the first binder polymer, the second coating layer may be composed of the second binder polymer, and the third coating layer may be composed of the third binder polymer.

With respect to the related separator having a constitution in which the coating layer containing the inorganic particle and the binder polymer are coated on both surfaces, because the coating layer is composed of an excess amount of the inorganic particles that occupy most part, it may be effective in solving a safety problem that may occur due to nail penetration, and so on. However, the coating thickness is inevitably increased due to the inorganic particles, thus resulting in the entire volume to increase, while a relatively lower content of the binder polymer results in insufficient electrode adhesion. Further, while the content of the binder polymer may be increased, it may cause a problem that the same level of safety as provided by the configuration mentioned above cannot be provided.

In contrast, the separator according to an embodiment of the present disclosure overcomes the above problem. That is, by including a first coating layer containing inorganic particle and a first binder polymer only on one surface of the porous separator substrate, it is thus possible to reduce the total volume of the separator and prevent deterioration of the capacity relative to volume, enhance the strength of the separator itself, and overcome the shortcoming such as increased battery thickness due to swelling from the formation process. Further, by including a second coating layer containing the second binder polymer and a third coating layer containing the third binder polymer respectively on the first coating layer and the other surface of the porous separator substrate, it is possible to further increase the adhesion between the electrode and the separator, and accordingly, a battery including the separator according to the present disclosure can have further improved performance.

In this example, considering that the first coating layer is coated on only one surface, the first coating layer may have a density of 0.5 $g/cm^3$ to 6.0 $g/cm^3$, and more particularly, a density of 2.0 $g/cm^3$ to 5.0 $g/cm^3$ and a thickness of 2 μm to 10 μm to exhibit desired level of safety, such as enhanced strength of the separator. The second coating layer and the third coating layer may independently have a thickness of 0.1 μm to 3 μm to exhibit sufficient adhesion with the adjacent electrodes without causing a considerable increase in the total thickness of the separator.

Outside the above ranges, that is, if the density of the first coating layer is too low or if the thickness is too thin, there is a problem in which safety may not be enhanced to the desired level, and it is also not possible to suppress the growing thickness of the battery when swelling occurs in the formation process. Further, it is also not preferred if the density is too high or the thickness is too thick, because of a problem of deteriorating adhesion between the separator and the second coating layer and growing total volume of the separator. It is also not preferred if the thickness of the second coating layer and the third coating layer is too thin, because in that case, sufficient adhesion with the adjacent electrodes is not exhibited, or if they are too thick, total volume of the separator increases.

These coating layers may be coated on the porous separator substrate with various methods. Specifically, the first coating layer and the second coating layer may be coated with die coating, or more particularly, may be sequentially coated with slide-slot die coating, and the third coating layer may be coated with roll coating.

In order to more specifically describe the coating method of the coating layers on the porous separator substrate, a preparation method of separator for an electrochemical device according to an aspect of the present disclosure is provided.

Specifically, the preparation method of a separator for an electrochemical device includes: supplying a porous separator substrate; coating a first coating agent and a second coating agent on one surface of the porous separator substrate by means of a first coating part of a die coating method that includes a first roller; coating a third coating agent on the other surface of the porous separator substrate by means of a second coating part of a roll coating method that includes a second roller; and forming a first coating layer, a second coating layer, and a third coating layer by drying the porous separator substrate coated with the first coating agent, the second coating agent, and the third coating agent. A pattern may be formed on a surface of the second roller.

In an example, while the porous separator substrate is moved at a velocity of 40 m/min or higher within a system isolated from outside, the first coating agent and the second coating agent may be coated on one surface of the porous separator substrate and the third coating agent may be coated on the other surface of the porous separator substrate, respectively.

As confirmed by the inventors of the present disclosure, dip coating, which coats coating agents on both surfaces of the porous separator substrate, has technical limitations because it has limited working speed and it is also difficult to completely isolate a dipping device from outside, which allows solvent in the dipping device to continuously evaporate during the process and thus causes changes in the solids. Accordingly, dip coating has shortcomings such as and deteriorated uniformity in the coating layer and a need to ensure that the process is kept under the constant condition. When die coating is adopted for electrode coating, it may enhance productivity and increase coating uniformity. However, die coating has a problem of non-uniform surface of the third coating layer or a non-coated portion due to a problem of traveling characteristic which may occur in the soft substrate when coating the coating agent on the other surface.

In contrast, the preparation method of a separator according to an embodiment of the present disclosure solves all of the above problems and enhances coating uniformity of all the coating agents. Further, the preparation method allows high speed coating of the separator and thus can enhance productivity, and prevents problems of the dip coating method such as changes in the solids due to evaporation of solvent and thus further enhances uniformity of the coating layer.

Meanwhile, the roll coating method for coating the third coating agent of the second coating part may not be specifically limited as long as it is a roll coating method in a form of using the roller, and specifically, may be one, or a combination of two or more selected from a group consisting of a forward roll coating method, a reverse roll coating method, a microgravure coating method and a direct metering coating method.

Accordingly, in some embodiments, the second coating part may further include a coating agent supply to supply the third coating agent on the second roller, and a method of the coating agent supply for supplying the third coating agent is not limited. However, for more uniform coating of the coating agent, the third coating agent may be supplied using, specifically, one or a combination of two or more selected from a group consisting of a circulated bath method, a metering roll method and a die method.

Further, the second roller may be a roller that includes continuous or discontinuous projections on a surface of a roller body, or a roller that includes a roller body and a wire wound on an outer side of the roller body.

The projection may have a pattern having a straight line shape, a wave shape, a lattice shape, a polygon shape, or a circular shape.

The projection in the straight line shape may be in such a form that is vertical to a length direction of the roller, tilted in a length direction of the roller, or tilted symmetrically with each other with reference to a vertical center in a length direction of the roller.

The projection and the wire may be independently formed from an anti-slip material.

Surfaces of the projection and the wire may independently have a plane shape or a concave shape.

Since specific examples of the roll coating method and specific examples of the supply methods of the coating agent are already known in the art, further explanation will not be provided herein.

Further, according to an aspect of the present disclosure, a separator coating device for an electrochemical device for performing the preparation method of a separator is provided.

Specifically, the coating device of the separator includes: a supply configured to supply a porous separator substrate; a first coating part of a die coating method, which is configured to sequentially coat a first coating agent and a second coating agent on one surface of the porous separator substrate and which includes a first roller; a second coating part of a roll coating method, which is configured to coat a third coating agent on the other surface of the porous separator substrate and which includes a second roller; and a drying part configured to dry the coated porous separator substrate, in which a pattern is formed on a surface of the second roller.

Any of the related supply means may be employed, as long as they supply the porous separator substrate to the first coating part for coating the first coating agent and the second coating agent on one surface of the porous separator substrate. For one example, a supply roller may be employed.

Specifically, the first coating part may include a first coating die provided with a slot part for supplying the first coating agent and a slide part for supplying the second coating agent, to coat the first coating agent and the second coating agent consecutively and sequentially; and a first roller positioned opposite the first coating die while being in contact with the other surface of the porous separator substrate, and configured to support the other surface of the porous separator substrate when the first coating agent and the second coating agent are coated by means of the first coating die.

Further, the first coating part may include a slot coating die configured to supply the first coating agent; a slide coating die positioned adjacent to the slot coating die and configured to supply the second coating agent; and a first roller positioned opposite the adjacent slot coating die and slide coating die while being in contact with the other surface of the porous separator substrate, and configured to support the other surface of the porous separator substrate when the first coating agent and the second coating agent are coated.

That is, the first coating part may not be limited as long as it has a structure that includes the slide slot die coating method, and the first coating part may be an integral type in which the slide part and the slot part are formed on one coating die or a separate type in which a slot die and a slide die are included independently, respectively.

Accordingly, by the first coating part, the second coating agent may be allowed to naturally flow down on an upper surface of the first coating agent so that inter-mixing therebetween may be prevented, and accordingly, a double-layered coating layer may be naturally formed on the porous separator substrate.

In this example, an angle between the slot part and the slide part, or an angle between the slot coating die and the slide coating die may be 10 degrees to 80 degrees, more specifically, 30 degrees to 60 degrees, and discharge velocity of the first coating agent may be greater than discharge velocity of the second coating agent.

When the above ranges are satisfied, a coating thickness may be easily adjusted and coating layers having thin thickness may be formed without having inter-mixing between the two layers.

Further, the second coating part may include a second roller configured to rotate while being in contact with the other surface of the porous separator substrate, to coat a third coating agent without having a problem of traveling characteristics of a soft substrate; and a second coating die configured to supply a third coating agent on an outer surface of the second roller. In this example, the second coating part may be configured in a structure in which the third coating agent supplied from the second coating die is coated on the other surface when the second roller is rotated to contact the other surface of the porous separator substrate.

Meanwhile, a pattern, or more specifically, a micro pattern is formed on a surface of the second roller to further enhance traveling characteristic of the porous separator substrate.

According to an embodiment, the second roller may be a roller having continuous or discontinuous projections on a surface of a roller body or a roller having a roller body and a wire wound on an outer side of the roller body.

Further, the projections may be in a pattern having a straight line shape, a lattice shape, a polygon shape or a circular shape. Specifically, straight line shape projections may be in such a form that is vertical to a length direction of the roller, tilted in a length direction of the roller, or tilted symmetrically with each other with reference to a vertical center in a length direction of the roller.

The projections and the wire may be formed independently from an anti-slip material, and surfaces of the projections and the wire may be independently a plane shape or a concave shape.

According to the device as described above, the first coating agent and the second coating agent are coated by the die coating method while the porous separator substrate introduced into the first coating part from the supply portion for supplying the porous separator substrate is supported by means of the first roller on one surface of the porous separator substrate. Thereafter, on the other surface of the porous separator substrate of which one surface is coated with the first coating agent and the second coating agent, the third coating agent supplied to the second roller from the second coating die is coated by means of the second roller being rotated in contact with the other surface of the porous separator substrate, while the porous separator substrate is supported by means of the second roller of the second coating part, and as a result, the separator according to the present disclosure is prepared.

That is, according to an embodiment, the porous separator substrate is coated with the coating agents by the die coating method on one surface and by the roll coating method on the other surface, while being moved and introduced into the drying part by means of the rollers. Accordingly, coating uniformity of the first coating agent and the second coating agent may be enhanced, the problem of traveling characteristic which may occur in a soft substrate when the third coating agent is coated may be solved, and the problem such as non-uniform surface of the third coating layer or the generation of a non-coated area may be solved.

Further, according to an embodiment of the present disclosure, the device for manufacturing the separator for the electrochemical device may be positioned between the first roller and the second roller for enhancing traveling characteristic and directivity of the porous separator substrate, and may additionally include one or more guide rollers configured to guide advancing of the porous separator substrate while being in contact with the other surface of the porous separator substrate.

In this example, the guide roller may have a pattern, or more specifically, a micro pattern on a surface, like the second roller described above. According to an embodiment of the present disclosure, the guide roller may be a roller having continuous or discontinuous projections on a surface of a roller body or a roller having a roller body and a wire wound on outer side of the roller body. When the guide roller having such pattern formed thereon is used, traveling characteristic of the porous separator substrate may be further enhanced.

According to an embodiment of the present disclosure, the porous separator substrate may not be limited to a specific example only, as long as it has a structure that includes pores. Specifically, the porous separator substrate may be porous polymer film substrate or porous polymer non-woven substrate.

The porous polymer film substrate may be a porous polymer film made of polyolefin such as polyethylene and polypropylene, and such a polyolefin porous polymer film substrate expresses a shutdown function at a temperature of, for example, 80 to 130□.

In an example, the polyolefin porous polymer film may be formed of polyolefin-based polymer, e.g., polyethylene such as high-density polyethylene, linear low-density polyethylene, low-density polyethylene, and ultra high molecular weight polyethylene, polypropylene, polybutylene, polypentene, either individually or as a mixture of two or more of these, or a derivative thereof.

The representative examples of the commercially-available polyolefin porous polymer film that can be employed as the porous separator substrate may include wet polyethylene series (Asahi-Kasei E-Materials, Toray, SK Innovation, Entek), dry polypropylene series (Shenzhen Senior), dry polypropylene/polyethylene multi-layered structure series (Polypore, Ube) or the like, but not limited hereto.

Further, the porous polymer film substrate may be prepared by molding into a film shape, using various polymers such as polyester instead of polyolefin. Further, the porous polymer film substrate may be formed in a stack structure of two or more layers of films, and each layer of the film may be formed of polymer such as polyolefin, polyester, and so on as described above, either individually or as a mixture of two or more of these.

Further, instead of polyolefin mentioned above, the porous polymer film substrate and a porous nonwoven fabric substrate may be formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylene-naphthalene, and so on, either individually or as a mixture of these.

A thickness of the porous separator substrate is not strictly limited, although it may be in a range of 1 µm to 100 µm, or more specifically, in a range of 5 µm to 50 µm. When the thickness satisfies the above ranges, the porous separator substrate can maintain mechanical property, while the problem that the porous separator substrate acts as a resistance layer can be improved.

A pore size and a porosity of the porous separator substrate are not specifically limited, although the porosity may be in a range of 10% to 95%, and the pore size (diameter) may be 0.1 µm to 50 µm, preferably. When a pore size and a porosity are respectively less than 0.1 µm and 10%, the substrate may operate as a resistance layer. When a pore size and a porosity exceed 50 on and 95%, it is difficult to maintain the mechanical property. Further, the porous separator substrate may be in a fiber or membrane form.

The first coating agent includes an inorganic particle, a first binder polymer and a first solvent, the second coating agent includes a second binder polymer and a second solvent, and the third coating agent includes a third binder polymer and a third solvent. The first coating agent, the second coating agent, and the third coating agent may be coated and dried on the porous separator substrate, thus forming a first coating layer, a second coating layer, and a third coating layer, respectively.

The inorganic particles enable empty spaces to form therebetween and thus play role of a spacer that forms micropores and keeps a physical shape as well. Because the inorganic particles generally have a characteristic that does not change physical property even at a temperature as high as 200 □ or above, the formed organic/inorganic composite porous film has excellent thermal resistance.

Accordingly, in the electrochemical device including the separator, even when the separator within the battery is ruptured due to excessive conditions caused by internal or external factors such as high temperature, overcharging, external shock, or the like, the first coating layer will not easily allow both electrodes to be shorted completely. Further, even when short occurs, expansion of the short region is suppressed, and enhancement in the safety of the battery can be facilitated.

That is, the inorganic particle is not particularly limited as long as they are stable electrochemically. Accordingly, the inorganic particle that can be used in the present disclosure may not be limited if an oxidization and/or a reduction reaction does not occur in an operating voltage range (for example, 0 V to 5 V with reference to Li/Li+) of a battery in use. Specifically, considering that the inorganic particles having an ion transfer ability can facilitate performance enhancement and increase the ion conductivity within the electrochemical device, the inorganic particles with higher ion conductivity are preferred. Further, when the inorganic particles have a high density, they raise a problem of weight increase of a manufactured battery as well as difficulty with dispersion during coating. Therefore, the inorganic particles with a lower density may be preferred. Further, the inorganic particles having a high dielectric constant may contribute to an increased dissociation of the electrolyte salt (e.g., lithium salt) within liquid electrolyte, thereby enhancing ion conductivity of the electrolyte.

Due to the aforementioned reasons, the inorganic particles may be inorganic particles of a high dielectric constant, of which the dielectric constant is 5 or above, and preferably, 10 or above, or inorganic particles having piezoelectricity, or inorganic particles having an ion transfer ability, or a mixture thereof.

Examples of the inorganic particles having the dielectric constant of 5 or above may be $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or a mixture thereof, but not limited hereto.

The piezoelectric inorganic particles refer to a material which is nonconducting under a normal pressure, but exhibits electrically conducting property when internal structure changes under a certain pressure exerted thereto. It is a material that has not only a high dielectric characteristic such as a dielectric constant of 100 or above, but also a function of generating electric potential between both surfaces when one surface is charged positive and the opposite surface is charged negative with charges generated when the piezoelectric material is tensioned or compressed by a certain pressure exerted thereto.

When the inorganic particles having the characteristic described above is used, a positive electrode and a negative electrode are not directly in contact with each other because of the inorganic particles coated on the separator when internal short is caused between both electrodes due to external impact such as local crush, nail, or the like. Further, electric potential difference occurs within the particles because of the piezoelectricity of the inorganic particles, and electron migration, i.e., flow of micro electrical currents is made between both electrodes, and accordingly, gradual decrease in voltage of the battery and subsequently enhanced safety can be provided.

Examples of the inorganic particle having piezoelectricity may include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) hafnia ($HfO_2$) or a mixture thereof, but not limited hereto.

The "inorganic particle having an ion transfer ability" refer to inorganic particles that contain lithium atoms, but have an ability to move the lithium ions without storing lithium. Because the inorganic particles having an ion transfer ability may deliver and migrate lithium ions because of a kind of defect present within the particle structure, lithium ion conductivity within the battery may be enhanced, and accordingly, performance enhancement of the battery may be facilitated.

Examples of the inorganic particle having an ion transfer ability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)xOy-based glass such as $14Li_2O$-$9Al_2O_3$-$38TiO_2$-$39P_2O_5$ ($0<x<4$, $0<y<13$), lithium lanthanum titanate ($Li_xLa_yTiO_3$, $0<x<2$, $0<y<3$), lithium germanium thiophosphate such as $Li_{3.25}Ge_{0.25}P_{0.75}S_4$ ($Li_xGe_yP_zS_w$, $0<x<4$, $0<y<1$, $0<z<1$, $0<w<5$), lithium nitride such as $Li_3N$ ($Li_xN_y$, $0<x<4$, $0<y<2$), $SiS_2$-based glass such as $Li_3PO_4$—$Li_2S$—$SiS_2$ ($Li_xSi_yS_z$, $0<x<3$, $0<y<2$, $0<z<4$), $P_2S_5$-based glass such as LiI—$Li_2S$—$P_2S_5$ ($Li_xP_yS_z$, $0<x<3$, $0<y<3$, $0<z<7$), or a mixture thereof, but not limited hereto.

Using the inorganic particles described above, i.e., using high dielectric inorganic particles, inorganic particles having piezoelectricity, and inorganic particles having an ion transfer ability, synergistic effects of these can be doubled.

In the separator according to the present disclosure, the pores included in the separator substrate and the pore structure of the coating layer may be formed by adjusting the size of the inorganic particles constituting the first coating layer, content of the inorganic particles and composition of the inorganic particles and the binder polymer, and it is also possible that the pore size and the porosity may be adjusted together.

The size of the inorganic particle is not limited, but for the sake of forming a film with a uniform thickness and an appropriate porosity, the preferable size is within a range of 0.001 µm to 10 µm, if possible. When the size is less than 0.001 µm, dispersion deteriorates, and property of the separator is difficult to adjust. When the size of greater than 10 µm, a thickness of the separator prepared with uniform content of solids increases, and mechanical property deteriorates. Further, possibility in which internal short occurs at charging and discharging of the battery is increased because of an excessively large pore size.

The porosity may be in a range of 5% to 95%, preferably, but not limited hereto.

Content of the inorganic particle may not be specifically limited, but it may be 50 wt % to 99 wt % per 100 wt % with reference to a total weight of the first coating layer, and specifically, 60 wt % to 97 wt %, and more specifically, 70 wt % to 95 wt %. That is, a weight ratio between the inorganic particle and the first binder polymer may be 50:50 to 99:1, and specifically, 60:40 to 97:3, and more specifically, 70:30 to 95:5. When content of the inorganic particle satisfies the above ranges, content of the binder polymer further increases, and accordingly, a problem in which a pore size and a porosity of the formed coating layer are reduced may be prevented. Further, because content of the binder polymer is small, a problem in which peeling resistance of the coating layer deteriorates due to declining adhesion between the inorganic particles.

Specifically, the first binder polymer, the second binder polymer, and the third binder polymer may use a polymer having a lower glass transition temperature (Tg), and preferably, the temperature may cover a range of −200 ☐ to 200 ☐.

Further, the binder polymer may have characteristic which may represent a high degree of swelling of the electrolyte by being gelated when being impregnated into the liquid electrolyte. When the binder polymer has practically excellent degree of swelling of the electrolyte (or impregnation ratio), the electrolyte injected after the battery is assembled may permeates into the above polymer, and the polymer containing the absorbed electrolyte has an electrolyte ion conducting ability. Further, compared to the related hydrophobic polyolefin separator, the separator according to the present disclosure has an advantage in that application of the polar electrolyte for the battery which is difficult to be used in the related art can be employed as well as wetting on the electrolyte for the battery is improved. Accordingly, solubility parameter of the binder polymer, i.e., Hilderbrand solubility parameter covers a range of 15 $MPa^{1/2}$ to 45 $MPa^{1/2}$, and specifically 15 $MPa^{1/2}$ to 25 $MPa^{1/2}$, and more specifically, 30 $MPa^{1/2}$ to 45 $MPa^{1/2}$.

This is because, when the solubility parameter is less than 15 MPa$^{1/2}$ or more than 45 MPa$^{1/2}$, swelling is hardly performed with the related liquid electrolyte for the battery.

Specifically, the first binder polymer, the second binder polymer, and the third binder polymer may be independently one, or two or more selected from a group consisting of polyvinyliedene fluoride, polyvinyliedene fluoride-hexfluoropropylene, polyvinyliedene fluoride-trichlororethylene, polyvinyliedene fluoride-chlorotrifluoroethylene, polymethylmethacrylate, polyacrylonitrile, polyvinylpyrrolidone, polyvinyl acetate, ethylene vinyl acetate copolymer, polyethylene oxide, cellulose acetate, cellulose acetate butylate, celluose acetate propionate, cyanoethyl pullulan, cyanoethylpolyvinylalcohol, cyanoethylcelluose, cyanoethylsucrose, pullulan, carboxylmethyl cellulose, acrylionitrilestyrenebutadiene copolymer, and polyimide, but not limited hereto.

The inorganic particles bind to one another by the first binder polymer in a state where they are charged and contacted with one another, thereby forming interstitial volume between the inorganic particles, and the interstitial volume between the inorganic particles turns into empty spaces, that is, pores.

That is, the first binder polymer attaches the inorganic particles to one another such that they maintain the bonded state. For example, the first binder polymer connects and immobilizes between the inorganic particles. Further, the pores of the porous coating layer are those that are formed as the interstitial volume between the inorganic particles form voids, and these are the spaces that are confined by the inorganic particles which substantially surface-contact in a closed packed or densely packed structure of the inorganic particles.

The first solvent, the second solvent, and the third solvent have similar solubility parameters to the first binder polymer, the second binder polymer, and the third binder polymer to be used together, and the solvent having a low boiling point may be adopted. The solvent described above may allow uniform mixing and easy removal of the solvent after the mixing.

Examples of the first solvent, the second solvent, and the third solvent may be, independently, one compound or a mixture of two or more selected from a group consisting of acetone, tetrahydrofuran, methylenechloride, chloroform, dimethylformamide, N-methyl-2-pyrrolidone, cyclohexane, methanol, ethanol, isopropyl alcohol, and water.

In this example, the first solvent, the second solvent, and the third solvent may play a role of dissolving or dispersing the first binder polymer, the second binder polymer, and the third binder polymer according to types of the binder polymer mixed together, and specifically, the first solvent may also simultaneously play a dispersant role with respect to the inorganic particles that form the first coating agent together.

The first coating agent may be a slurry form prepared by dissolving the first binder polymer in the first solvent, adding the inorganic particles, and dispersing them. In this example, the inorganic particles may be added in a state of being ground in an appropriate size. The inorganic particles may be added into the solution of the first binder polymer and then dispersed while being ground with a ball milling method, or the like.

According to an aspect of the present disclosure, the electrochemical device including the positive electrode, the negative electrode, and the separator interposed between the positive electrode and the negative electrode may be provided, in which the separator is the separator for the electrochemical device according to an embodiment of the present disclosure described above.

The electrochemical device includes all devices that perform electrochemical reactions, specifically for example, all types of primary and secondary batteries, fuel cells, solar cells, or capacitors such as super capacitor devices, etc. Specifically, among the secondary batteries, a lithium secondary battery including a lithium metal secondary battery, a lithium ion secondary battery, a lithium polymer secondary battery, or a lithium ion polymer secondary battery may be preferably used.

Both the positive electrode and the negative electrode which are used together with the separator of the present disclosure may not be specifically limited, and may be prepared in a form in which electrode active material is bonded to electrode current collector, according to generally known method. Non-limiting examples of the positive electrode active material of the electrode active material may be the known positive electrode active material used in the positive electrode of the related electrochemical device, which may include, specifically, lithium manganese oxide, lithium cobalt oxide, lithium nickel oxide, lithium iron oxide or lithium composite oxide may be preferably used. Non-limiting examples of a negative electrode active material may be the known negative electrode active material used in the negative electrode of the related electrochemical device, which may include, specifically, a lithium absorbing material such as lithium metal or lithium alloy, carbon, petroleum coke, activated carbon, graphite, other carbonaceous materials or the like may be preferably used. Non-limiting examples of a positive electrode current collector may be aluminum, nickel, or foil prepared with a combination thereof, and non-limiting examples of a negative electrode current collector may be copper, gold, nickel, or copper alloy, or foil prepared with a combination thereof.

The electrolyte used in the electrochemical device according to an embodiment of the present disclosure may be salt having a A$^+$B$^-$ structure in which A$^+$ includes alkali metal cation such as Li$^+$, Na$^+$, K$^+$ or ions made of a combination thereof and W includes anions such as PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$, C(CF$_2$SO$_2$)$_3^-$ or ions made of a combination thereof, and the salt includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxy ethane, diethoxy ethane, tetrahydrofuran, N-methyl-2-pyrrolidone (NMP), ethylmethylcarbonate (EMC), gamma butyrolactone (g-butyrolactone) or a salt dissolved or dissociated in the organic solvent made of a mixture thereof, but not limited hereto.

The injection of the electrolyte may be performed at a proper stage of the battery assembly fabrication according to manufacturing process and desired property of a final product. That is, it may be adopted at a stage previous to the battery assembly or at a final stage of the battery assembly.

Advantageous Effects

The present disclosure gives the following effects.

As described above, a preparation method of separator for an electrochemical device according to an embodiment of the present disclosure uses a die coating method for coating one surface and uses a roll coating method for coating the other surface, thus solving a problem of traveling characteristic which may occur in the soft substrate when a coating agent is coated on the other surface, enhancing uniformity of a coating layer, and further maximizing productivity of the separator.

The preparation method of separator for the electrochemical device according to an embodiment of the present disclosure simultaneously enhances both adhesion between the separator and an electrode and safety of a battery by providing the separator including a first coating layer containing an inorganic particle and a binder polymer and a second coating layer containing the binder polymer on one surface of a separator substrate, and a third coating layer containing the binder polymer on the other surface of the separator substrate.

DESCRIPTION OF DRAWINGS

FIG. 1 is a schematic view illustrating a separator according to an embodiment.

FIG. 2 is a flowchart describing a preparation method of separator with utilization of a coating device according to an embodiment.

FIG. 3 is an enlarged view illustrating the first coating part of FIG. 2 in enlargement.

FIGS. 4 to 5 are views illustrating an example of a second roller according to an embodiment.

FIGS. 6 to 10 are schematic views illustrating a pattern of a second roller according to an embodiment.

FIGS. 11 to 12 are schematic views illustrating an example of a second roller according to an embodiment.

FIGS. 13A to 13G are schematic views illustrating a cross section of a pattern of a second roller according to an embodiment.

BEST MODE

Hereinafter, preferred embodiments of the present disclosure will be described in detail with reference to the accompanying drawings. However, the description is proposed for easier understanding of the present disclosure, and a scope of the present disclosure is not limited hereto.

FIG. 1 schematically illustrates a separator 100 for an electrochemical device according to an embodiment.

Referring to FIG. 1, the separator 100 is formed in an unsymmetrical structure in which both surfaces are unsymmetrical with reference to a porous separator substrate 100, in which a first coating layer 120 containing an inorganic particle and a first binder polymer and a second coating layer 130 containing a second binder polymer are formed sequentially on one surface of the porous separator substrate 110, and a third coating layer 140 containing a third binder polymer is formed on the other surface of the porous separator substrate 110.

More specifically, the first coating layer 120 is composed of the inorganic particle and the first binder polymer, and the second coating layer 130 and the third coating layer 140 are respectively composed of the second binder polymer and the third binder polymer.

As described above, the separator 100 according to an embodiment of the present disclosure includes the first coating layer 120 containing the inorganic particle and the first binder polymer only on one surface of the porous separator substrate 110. Compared to an example in which a configuration such as the first coating layer 120 is formed on both surfaces, the total volume of the separator 100 is reduced. Accordingly, strength of the separator 100 itself is enhanced and a problem such as increased battery thickness due to swelling of the formation is solved simultaneously, while deteriorated content relative to volume is prevented. Further, when only the first coating layer 120 containing the inorganic particle is coated, adhesion with adjacent electrodes is not sufficiently enhanced. Therefore, on both surfaces of the porous separator substrate 110, a surface formed with the first coating layer 120 includes the second coating layer 130 and the third coating layer 140 respectively containing the second binder polymer and the third binder polymer on the first coating layer 120, and accordingly, adhesion between the electrode and the separator 100 is further enhanced, which further enhances performance of a battery including the separator 100 according to the present disclosure.

In this example, the first coating layer 120, which plays a role of enhancing safety of the battery including the separator 100 for the purpose of enhancement of the strength of the separator 100, is only formed on one surface with a thickness (T) of 2 μm to 10 μm in order to properly exhibit the effects described above. Meanwhile, the second coating layer and the third coating layer, which are formed on both surfaces of the porous separator substrate and play a role of sufficiently enhancing adhesion between the electrode and the separator by directly contacting the electrode, is formed with a thickness (t) of 0.1 μm to 3 μm to achieve sufficient adhesion with a thinner thickness thanks to high content of the binder polymer.

Meanwhile, FIG. 2 is a flowchart schematically describing a preparation method of separator using a preparation apparatus according to an embodiment. FIG. 3 is an enlarged view schematically illustrating the first coating part 230 of FIG. 2.

Referring to the drawings, a coating device 200 for performing the preparation of the separator includes a separator substrate supply roller 220 for supplying a porous separator substrate 210; a first coating part 230 for sequentially coating a first coating agent 233 and a second coating agent 234 on one surface 211 of the porous separator substrate 210; a second coating part 240 for coating a third coating agent 243 on the other surface 212 of the porous separator substrate 210; and a drying part 250 for drying the porous separator substrate 210 of which both surfaces are coated.

The first coating part 230 includes a first coating die 232 provided with a slot part 232(a) for supplying the first coating agent 233 and a slide part 232(b) for supplying the second coating agent 234; and a first roller 231 positioned opposite the first coating die 232 while being in contact with the other surface 212 of the porous separator substrate 210 and supporting the other surface 212 of the porous separator substrate 210 when the first coating agent 233 and the second coating agent 234 are coated with the first coating die 232. In this example, an angle (θ) between the slot part 232(a) and the slide part 232(b) may be 10 degrees to 80 degrees, and specifically, 30 degrees to 60 degrees.

The second coating part 240 includes a second roller 243 for rotating while being in contact with the other surface 212 of the porous separator substrate 210; and a second coating die 242 for supplying the third coating agent 243 on an outer surface of the second roller 243.

Further, the preparation apparatus 200 according to an embodiment may additionally include a guide roller 260 positioned between the first roller 231 and the second roller 232 and guiding advancement of the porous separator substrate 210 while being in contact with the other surface 212 of the porous separator substrate 210.

Accordingly, on one surface 211 of the porous separator substrate 210, the first coating agent 233 and the second coating agent 234 are coated by a die coating method while the porous separator substrate 210 introduced into the first coating part 230 from the supply roller 220 is supported with the first roller 231.

Thereafter, the porous separator substrate 210 in a state of being coated with the first coating agent 233 and the second coating agent 234 advances to the second coating part 240 with the guide roller 260 contacting the other surface 212, and the third coating agent 243 supplied to the second roller 241 from the second coating die 242 is coated on the other surface 212 of the porous separator substrate 210 with the second roller 243 rotating in a state of contacting the other surface 212 of the porous separator substrate 210, while being supported by the second roller 241 of the second coating part 240.

The porous separator substrate 210 coated with the coating agents 233, 234, 243 on both surfaces thereof moves to the drying part 250, and finally goes through a drying process, and as a result, the separator according to an embodiment is prepared.

In this example, although not illustrated in the drawings, the first coating part 230 may additionally include a slot coating die for supplying the first coating agent 233 instead of the first coating die 232 of an integral type in which the slot part 232(a) and the slide part 232(b) are formed together; and a slide coating die positioned adjacent to the slot coating die to supply the second coating agent 234.

Further, a pattern is formed on a surface of the second roller 241 in order to further enhance traveling characteristic of the porous separator substrate 210.

Referring to FIG. 4, the second roller according to an embodiment of the present disclosure may be a roller 300 including a roller body 310 and a wire 320 wound on an outer side of the roller body. In this example, the wire may be wound so as to be tightly contacted without being displaced, or may be wound so as to be displaced by a certain interval, so as to ensure that an outer side of the roller body is not exposed externally, as illustrated in FIG. 4. A diameter of the wire may be less than 1 mm, and specifically, 0.1 mm to 1 mm.

The second roller illustrated in FIG. 4 is wound such that a certain pattern is formed on a surface with concavely recessed valley portions, i.e., grooves being formed between the wires contacting each other. In this example, a volume of the above space is controlled by adjusting a diameter of the wire, to thus meter the flow rate of the third coating agent to be flowed through the second roller as desired.

Referring to FIG. 5, the second roller according to an embodiment may be a roller 400 including continuous or discontinuous projections 420 on a surface of the roller body 410.

The projections in various patterns may be employed, such as straight line shape projections, wave shape projections, polygon shape projections, or circular shape projections, in addition to the lattice shape projections illustrated in FIG. 5.

FIGS. 6 to 8 exemplify a straight line shape of the projection, and specifically, a shape 422 vertical in a length direction of the roller, a shape 423 tilting in a length direction of the roller, or a shape 421 tilting symmetrically with each other with reference to a vertical center in a length direction of the roller.

Further, FIG. 9 illustrates a wave shape projection 424, and FIG. 10 illustrates a lattice shape projection 425. When a lattice shape projection is formed, grooves tilting to left and right are formed in fluid communication with each other. Accordingly, a flow path for the coating agent is secured in up, down, left, and right directions instead of one direction, and more uniform coating may be performed.

According to an embodiment, a width (interval between the grooves) of the projection may be 5 mm to 30 mm, and specifically, 10 mm to 25 mm, and an interval between the projections (width of the groove) may be 0.1 mm to 3 mm, and specifically, 0.5 mm to 1 mm. Further, a depth of the groove may be 0.1 mm to 3 mm, and specifically, 0.5 mm to 1 mm.

Generally, the porous separator substrate basically has soft property. Specifically, when a thickness of the porous separator substrate is less than 10 µm, when moving for a coating process, meandering phenomenon i.e., the phenomenon in which the porous separator substrate in the advancing movement slantingly moves to left and right occurs, in which case the surface of the third coating layer may not be uniform or have a non-coated area generated thereon. As a result, productivity of the separator may deteriorate.

However, according to an embodiment, while the porous separator substrate is conveyed to above the surface of the second roller, a portion of the porous separator substrate that is faced in contact with the pattern formed on a surface of the second roller, i.e., a portion of the porous separator substrate that is faced in contact with the groove between the projections or the groove between adjacent wound wires, is sunken into the groove by a certain depth, and this results in the advancing porous separator substrate fixed in the grooves. Accordingly, the meandering phenomenon, in which the porous separator substrate in the advancing movement slantingly moves to left and right during processes of conveyance and coating is prevented, and linearity of the traveling can be enhanced.

Specifically, when the porous separator substrate is soft material and less than 10 µm in thickness, the meandering phenomenon may be more problematic in the coating process. The problem can be solved by employing the second roller according to an embodiment of the present disclosure.

Effects of enhancing linearity of traveling by fixing the porous separator substrate with the pattern formed on the surface of the second roller are anticipated in all the examples where the pattern of the projections is the straight line shape projections, wave shape projections, lattice shape projections, polygon shape projections, or circular shape projections. Specifically, the straight line type projections in which the projections are symmetrically tilted with reference to a vertical center in a length direction of the roller such that the grooves formed by these projections are respectively tilted toward both ends of the roller with reference to a vertical center in a length direction of the roller, may have further significantly improved linear traveling without slanting to any side from the center of the roller, since the porous separator substrate sunken into the grooves is pulled apart from the center to both end directions.

According to an embodiment of the present disclosure, the projection and the wound wire formed on the second roller may be independently formed from an anti-slip material for enhancement of linear traveling characteristic of the porous separator substrate.

For an anti-slip material, any related material having effects of preventing slip may be used. Non-limiting examples may be any one or a mixture of two or more selected from a group consisting of ethylene-vinyl acetate copolymer, ethylene-α-olefin copolymer, propylene-α-olefin copolymer, silicon resin (organomodified polysiloxane, fluoride containing organomodified polysiloxane, polysiloxane-modified polyisocyante, etc), rubber, and thermoplastic elastomer (TPE) (olefin-based TPE and olefin-based thermoplastic vulcanizate (TPV), styrene-based TPC, urethane-based TPE (TPU), fluorine-based TPE, polyester-based TPE, PVC-based TPE, polyamide-based TPE, etc).

Referring to FIG. 11, the second roller 500 according to an embodiment of the present disclosure may have an embossing form in which circular shape projections 520, semicircular shape projections, polygon shape projections (tetrahedral or trapezohedral, or the like), or other projections with various shapes are formed on the surface of the roller body 510.

Referring to FIG. 12, the second roller 600 according to an embodiment of the present disclosure may have projections 620 projecting in disordered and various shapes on the surface of the roller body 610. The projections 620 may be formed to have a greater roughness than the roller body by treating the surface of the roller body 610 with sanding, for example.

Further, cross sections of the projections and the wires of the second roller described above may be formed as various polygons such as circular shape, semicircular shape, rectangular shape, square shape, trapezoid shape, or the like. Surfaces of the projections and the wires, or specifically, the surfaces of the cross sections thereof may have various shapes, and specifically, may independently have a plane shape or a concave shape.

FIGS. 13A to 13G illustrate examples of the cross sections (e.g., rectangle, trapezoid having a longer upper side, trapezoid having a longer lower side, semicircle, or the like) of the projections and the wires according to an embodiment of the present disclosure, and the surfaces thereof being in a plane shape or a inwardly-recessed concave shape. In this example, when the surface is in a concave shape, the concave portion on the surface of the projection may also play a role of fixing the porous separator substrate, in addition to the groove playing a role of fixing the porous separator substrate as described above.

As described above, the separator substrate is coated with the coating agents by the die coating method on one surface and by the roll coating method on the other surface while being moved by the rollers to be introduced into the drying part. Accordingly, coating uniformity of the first coating agent and the second coating agent can be enhanced. Further, since the problem in the traveling characteristic is solved, which may otherwise occur in a soft substrate when coating the third coating agent on the other surface, the problem such as non-uniformity of the surface of the third coating layer or generation of a non-coated area can be solved, and productivity of the separator can be maximized.

Hereinafter, the present disclosure will be further described with reference to certain Examples, but it is to be noted that the Examples are provided only for illustration of the present disclosure, and the scope of the present disclosure may not be limited with the Examples provided below.

Example 1

In order to prepare the first coating agent, polyvinylidene-fluoride-hexafluoropropylene copolymer (PVdF-HFP) was added as the first binder polymer to acetone as the first solvent and dissolved for about 12 hours at 50 □ so that the first binder polymer solution was prepared. $Al_2O_3$ powder (mean diameter of 600 mn) was mixed to the first binder polymer solution to prepare a slurry in which the weight ratio of the first binder polymer and inorganic particle was 10:90, and final content of the solids of the first binder polymer and the inorganic particle was 20 wt %.

Further, PVdF-HFP as the second binder polymer and the third binder polymer was added to acetone as the second solvent and the third solvent to obtain 2.5 wt % solids, respectively and dissolved, and as a result, the second coating agent and the third coating agent were prepared, respectively.

Using the polyolefin porous film having a thickness of 9 μm as the substrate, and using the device as illustrated in FIG. 2, the first coating agent and the second coating agent were coated by the first coating part with the die coating method, and the third coating agent was coated by the second coating part with the roll coating method that was used for supplying the coating agent with the die method, in which the first coating agent was coated to a thickness of 5 μm, and the second and third coating agents were coated to a thickness of 0.5 μm, and then after drying in an oven at 70 □, the separator was prepared.

In this example, the roller (second roller) of the second coating part with the roll coating method was a roller having the projections in such a shape that the projections are tilted symmetrically with each other with reference to a vertical center in a length direction of the roller, as illustrated in FIG. 6. In this example, an interval between the projections was 20 cm, a width of the groove formed between the projections was 0.5 mm, and a depth of the groove was 1 mm. Further, the projection was tilted in a shape of an oblique line that was inclined by 45 degrees to both ends with reference to a vertical center in a length direction of the roller.

Comparative Example 1

Using only a slurry mixing PVdF-HFP binder polymer and $Al_2O_3$ powder with a weight ratio of 10:90 as the coating agent, both surfaces of the polyolefin porous film having a thickness of 9 μm were coated to a thickness of 5 μm, respectively, in which the slurry was coated on one surface with the die coating method and coated on the other surface with the roll coating method. After drying in the oven at 70 □, the separator was prepared.

Experimental Example 1

Two sheets of separators prepared in Example 1, Example 2, and Comparative Example 1 were overlapped and laminated at 100 □, and the adhesion was measured with a tensile strength measuring equipment with the result of measurements as listed in Table 1 below.

TABLE 1

|  | Example 1 | Comparative Example 1 |
| --- | --- | --- |
| Adhesion (gf/25 mm) | 85 | n/a |

As shown in Table 1, when the separator of Example 1 is used, higher adhesion with the electrode is expected compared to using of the separator of Comparative Example 1.

Example 2

The separator was prepared in the same manner as Example 1 except for adopting a microgravure coating method for the second coating part of FIG. 2 in Example 1.

Example 3

The separator was prepared in the same manner as Example 1 except for adopting a direct metering coating method for the second coating part of FIG. 2 in Example 1.

Comparative Example 2

The separator was prepared in the same manner as Example 1 except for adopting the die coating method for the second coating part of FIG. 2 in Example 1.

Experimental Example 2

The coating surfaces of the separators prepared in Examples 1 to 3 and Comparative Example 2 were observed for a presence of non-coated area, with the result as listed in Table 2 below.

In this example, as a result of observing the coating surface of the separator coated to 1000 m, X was marked when there was no presence of non-coated area of a diameter less than 2 mm observed, and O was marked when there was one or more non-coated area of a diameter less than 2 mm observed.

TABLE 2

|  | Example 1 | Example 2 | Example 3 | Comparative Example 2 |
| --- | --- | --- | --- | --- |
| Presence of non-coated area | X | X | X | O |

Referring to Table 2, compared to Comparative Example 2 which adopted die coating method for coating both surfaces of the porous separator substrate and generated non-coated area, the presence of non-coated area was not observed in the separator which was prepared by adopting the coating method of the coating agents according to the present disclosure.

Example 4

As illustrated in FIG. 12, the separator was prepared in the same manner as Example 1 except for using a roller formed with micro bumps by sanding a surface of the roller body as the roller (second roller) of the second coating part.

Experimental Example 3

In the separators prepared by coating to 1,000 m in length according to Example 1, Example 4 and Comparative Example 1, the length of meandering was measured with a steel ruler in a rewinder.

TABLE 3

|  | Example 1 | Example 4 | Comparative Example 1 |
| --- | --- | --- | --- |
| Length (mm) of meandering | 1 or less | 1 or less | 3 |

Referring to Table 3, Comparative Example 1 that uses the roller having no pattern on the surface of the second coating part showed a length of meandering as large as 3 mm, but in contrast, Examples 1 and 4 that use the roller of the second coating part having projections in a symmetrically tilted shape, or micro bumps formed thereon showed a length of meandering significantly reduced to 1 mm or less. Accordingly, it was confirmed that the traveling characteristic of the separator substrate was greatly enhanced with the preparation method according to Examples 1 and 4.

Experimental Example 4

While coating to a length of 1000 m with the preparation method according to Examples 1 and 4 and Comparative Example 1, EPC load was measured with the Edge Position Control (EPC) device (Nireco). The 'EPC load' herein refers to a maximum distance by which the EPC device was actually moved during an operation, relative to a movement range setting.

TABLE 4

|  | Example 1 | Example 4 | Comparative Example 1 |
| --- | --- | --- | --- |
| EPC Load (%) | 32 | 37 | 79 |

Referring to Table 4, Comparative Example 1 of using the roller having no pattern on the second coating part showed the EPC load as high as 79%, but in contrast, the EPC loads were 32% and 37% and the length of meandering was significantly reduced to 1 mm or less in Examples 1 and 4 of using the roller of the second coating part formed with the projections in a symmetrically tilted shape or micro bumps. Accordingly, it was confirmed that Examples 1 and 4 solved a meandering problem and significantly enhanced linearity of the traveling characteristic during coating and conveyance of the porous separator substrate.

The present disclosure has been described in detail. However, it should be understood that the detailed description and specific examples, while indicating preferred embodiments of the disclosure, are given by way of illustration only and various changes and modifications within the scope of the disclosure will become apparent to those skilled in the art from this detailed description.

What is claimed is:

1. A preparation method of a separator for an electrochemical device, the preparation method comprising:
supplying a porous separator substrate;
coating a first coating agent and a second coating agent on one surface of the porous separator substrate by a first coating part of a die coating method that includes a first roller;
coating a third coating agent directly on the other surface of the porous separator substrate by a second coating part of a roll coating method that includes a second roller; and
forming a first coating layer, a second coating layer, and a third coating layer by drying the porous separator substrate coated with the first coating agent, the second coating agent, and the third coating agent,
wherein a pattern is formed on a surface of the second roller,
wherein the third coating agent does not include inorganic particles,
wherein the roll coating method of the second coating part is a direct metering coating method,
wherein the second roller is a roller having continuous or discontinuous projections on a surface of a roller body,
wherein the projections are in a pattern having a straight line shape,
wherein the straight line shape projections include a shape symmetrically tilted with reference to a vertical center in a length direction of the roller,
wherein the projections are tilted in a shape of an oblique line that is inclined by 45 degrees to both ends with reference to a vertical center in a length direction of the roller, wherein the projections form a flow path for the third coating agent, wherein a portion of the porous separator substrate that is in contact with the pattern formed on a surface of the second roller is sunken into the groove, preventing a meandering phenomenon of the porous separator substrate and preventing non-uniformity of a surface of the third coating layer.

2. The preparation method of claim 1, wherein the first coating agent and the second coating agent are coated on one surface of the porous separator substrate, and the third coating agent is coated on the other surface of the porous separator substrate, respectively, while the porous separator substrate is moved at a velocity of 40 m/min or higher within a system isolated from outside.

3. The preparation method of claim 1, wherein at least one of the projections and the wire are formed from an anti-slip material.

4. The preparation method of claim 1, wherein surfaces of the projections and the wire are independently in a plane shape or a concave shape.

5. The preparation method of claim 1, wherein the porous separator substrate is composed of polyolefin-based polymer.

6. The preparation method of claim 1, wherein the first coating agent comprises an inorganic particle, a first binder polymer, and a first solvent, and the second coating agent comprises a second binder polymer and a second solvent, and the third coating agent comprises a third binder polymer and a third solvent.

7. The preparation method of claim 1, wherein the first coating layer has a density of 0.5 g/cm$^3$ to 6.0 g/cm$^3$, and a thickness of 2 μm to 10 μm.

8. The preparation method of claim 1, wherein the second coating layer and the third coating layer independently have a thickness of 0.1 μm to 3 μm.

* * * * *